(12) United States Patent
Kasuga

(10) Patent No.: US 6,811,212 B2
(45) Date of Patent: Nov. 2, 2004

(54) VEHICLE BODY FRAME

(75) Inventor: Tatsuo Kasuga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/729,703

(22) Filed: Dec. 5, 2003

(65) Prior Publication Data

US 2004/0113464 A1 Jun. 17, 2004

(30) Foreign Application Priority Data

Jun. 12, 2002 (JP) ........................................ 2002-355569

(51) Int. Cl.[7] .............................................. B62D 25/08
(52) U.S. Cl. .............. 296/205; 296/203.02; 296/187.03
(58) Field of Search ....................... 296/187.09, 203.01, 296/204, 205, 203.02, 203.04, 187.03, 187.11, 187.12

(56) References Cited

U.S. PATENT DOCUMENTS 6,203,098 B1 * 3/2001 Motozawa et al. .... 296/187.09
6,312,038 B1 * 11/2001 Kawamura et al. .... 296/187.09
6,394,535 B1 * 5/2002 Kawamura et al. .... 296/187.09
6,695,393 B1 * 2/2004 Aouadi et al. ......... 296/203.02

FOREIGN PATENT DOCUMENTS

| EP | 0 888 953 | 1/1999 |
| JP | 05-065076 | 3/1993 |

* cited by examiner

Primary Examiner—Jason Morrow
(74) Attorney, Agent, or Firm—Merchant & Gould P.C.

(57) ABSTRACT

A vehicle body frame is such that hollow frame members 40 such as side frames extending longitudinally along a vehicle body are provided thereon. Two inner partition plates 42, 43 are integrally formed in the interior of each of the hollow frame member in such a manner that the two inner partition plates extend in a longitudinal direction of the frame member and are close to each other along plate surfaces 42a, 43a thereof, so that a central space portion 44 defined by the two inner partition plates therebetween is formed in the interior of the hollow frame member, whereby side plates 41 constituting the hollow frame member can be dissociated at portions of the side plates which face the central space portion by virtue of a buckling load.

3 Claims, 10 Drawing Sheets

$b1 + b2 = 150$ mm
(CONSTANT)

$r = L/8 = 0.125 \times L$ $h1 = r = 0.125 \times L$ $h2 = (L - 2 \times \pi \times r)/4 = 0.054 \times L$ $h3 = h1 + h2 = (0.125 + 0.054) \times L \fallingdotseq 0.18 \times L$

VEHICLE BODY FRAME

BACKGROUND OF THE INVENTION

The present invention relates to an improved vehicle body frame technique.

In vehicles, vehicle body frames are known in which hollow frame members such as side frames extending longitudinally along a vehicle body are provided (for example, refer to Patent Literature No. 1).

[Patent Literature No. 1]

JP-A-5-65076 (pages 2 and 3, FIGS. 1 and 6)

According to Patent Literature No. 1, a conventional vehicle body frame is such that longitudinal and transverse ribs are integrally formed within a hollow frame member such as a front-end or rear-end side frame extending longitudinally along a vehicle body. When a vehicle is subjected to a front-end or rear-end collision, the hollow frame member plastically deforms so that crash energy can be absorbed.

In the conventional vehicle body frame, the hollow frame member buckles and deforms in a bellows-like fashion from a distal end thereof when crash energy is applied to the distal end of the hollow frame member. The larger the hollow frame member deforms, the more the crash energy can be absorbed.

Incidentally, it is known that after the hollow frame member is deformed to a certain extent, a larger force than that applied before is required to deform the hollow frame member further. This still requires a further improvement to be made in order to increase the absorption of crash energy.

SUMMARY OF THE INVENTION

Then, an object of the invention is to provide a technique which can increase further the absorption of crash energy by the hollow frame member.

With a view to attaining the object, according to a first aspect of the invention, there is provided a vehicle body frame characterized in that hollow frame members such as side frames which extend longitudinally along a vehicle body are provided thereon, and in that two inner partition plates are formed integrally in the interior of each of the hollow frame members in such a manner that the two inner partition plates extend in a longitudinal direction of the frame member and are close to each other along plate surfaces thereof, so that a central space portion defined by the two inner partition plates therebetween is formed in the interior of the hollow frame member, whereby side plates constituting the hollow frame member can be dissociated at portions of the side plates which face the central space portion by virtue of a buckling load.

The hollow frame member can be dissociated at the portions of the side plates constituting the hollow frame member which face the central space portion by virtue of a buckling load.

Consequently, when the hollow frame member plastically deforms in a bellows-like fashion by virtue of crash energy applied to the longitudinally distal end of the hollow frame member, the two inner partition plates are caused to strike each other so that the side plates can be broken at the breakable portions, whereby the hollow frame member can be dissociated into two parts from the breakable portions so broken which act as a boundary. The buckling strength at the dissociated portion is extremely smaller than the buckling strength of the hollow frame member before it is dissociated. The size of the hollow frame member that remains after it is deformed can be decreased further. As a result, the absorption of crash energy by the hollow frame member can be increased further.

According to a second aspect of the invention, there is provided a vehicle body frame as set forth in the first aspect of the invention, where in the side plates constituting the hollow frame member each have a frail portion formed at the portion which faces the central space portion.

By forming the frail portions at the portions of the side plates constituting the hollow frame member which face the central space portion, the breakage of the side plates at the breakable portions can be facilitated.

According to a third aspect of the invention, there is provided a vehicle body frame as set forth in the first or second aspect of the invention, wherein a rib is formed on the plate surface of at least either of the two inner partition plates.

Since the rib is formed on the plate surface of at least either of the two inner partition plates, the rigidity of the inner partition plate can be enhanced. When the hollow frame member plastically deforms in a bellows-like fashion by virtue of crash energy, the inner partition plate can be caused to plastically deform in a more regulated waveform-like fashion.

DETAILED DESCRIPTION OF THE PREFERRED EMBODIMENTS

Figure 1:
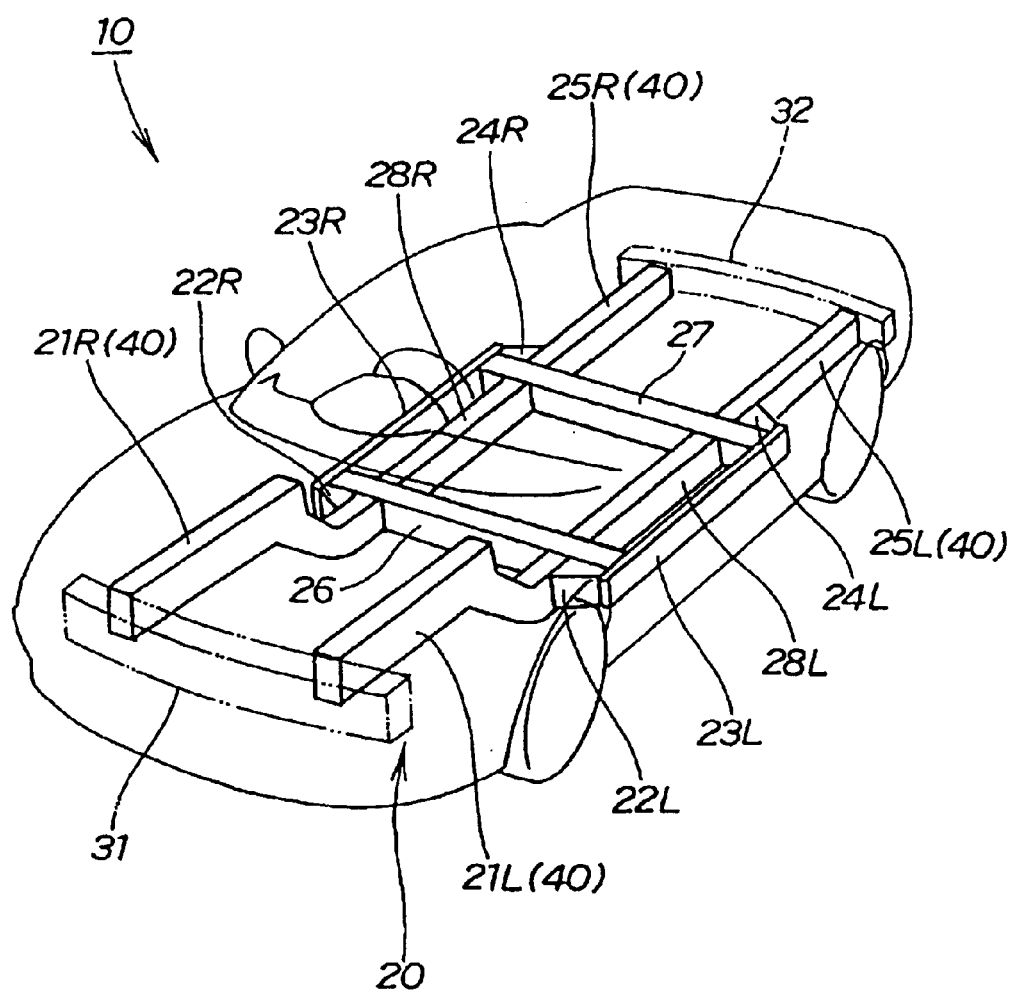
FIG. 1. is a perspective view of a vehicle according to the invention.

An embodiment of the invention will be described based on the accompanying drawings. Note that terms such as "front", "rear", "left", "right", "upper" and "lower" indicate directions as viewed from the perspective of the driver. In addition, the drawings are viewed in directions in which reference numerals are oriented.

FIG. 1 is a perspective view of a vehicle according to the invention. A vehicle body frame 20 of a vehicle 10 such as an automobile mainly includes left and right front-end side frames 21L, 21R which extend from a front end portion of a vehicle body toward a rear thereof, left and right side outriggers 22L, 22R which are joined to rear ends of the front-end side frames 21L, 21R, left and right side sills 23L, 23R which are joined to rear portions of the side outriggers 22L, 22R in such a manner as to extend rearward, left and right rear-end side frames 25L, 25R which are joined to rear ends of the side sills 23L, 23R via left and right connecting members 24L, 24R in such a manner as to extend rearward, a front cross member 26 which is provided to extend between rear ends of the left and right front-end side frames 21L, 21R, a rear cross member 27 provided to extend between rear ends of the left and right rear-end side frames 25L, 25R, and left and right floor frames 28L, 28R.

Reference numeral 31 denotes a front bumper and reference numeral 32 denotes a rear bumper.

The left and right front-end side frames 21L, 21R and the left and right rear-end side frames 25L, 25R are referred to, as a whole, as a side frame 40 provided on the vehicle body frame 20 in such a manner as to extend longitudinally. The side frame 40 will be described in detail below.

Figure 2A:
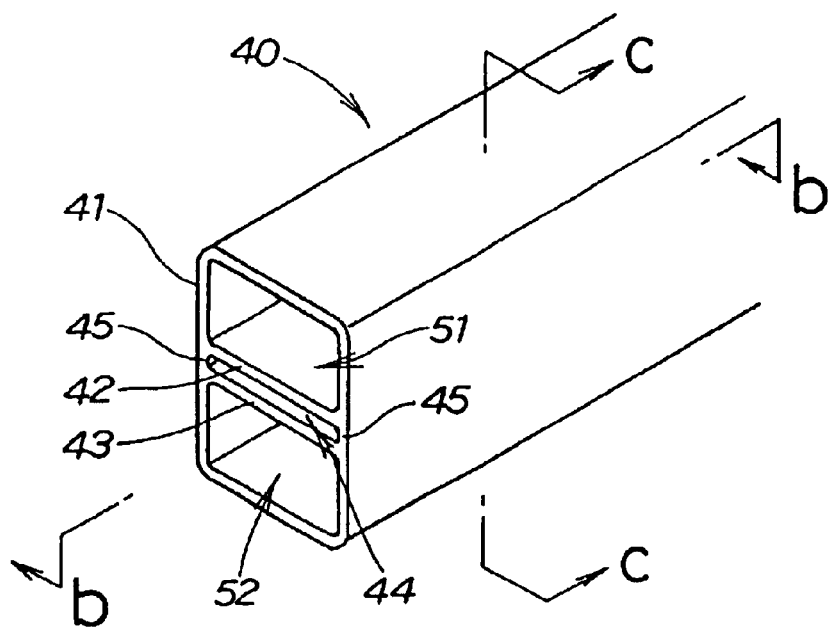
FIGS. 2A to 2C are diagrams illustrating the construction of a side frame (a hollow frame member) according to the invention.
Figure 2B:
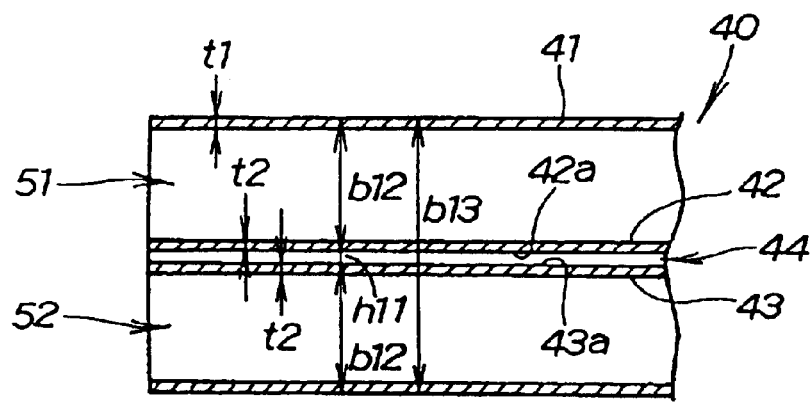
Figure 2C:
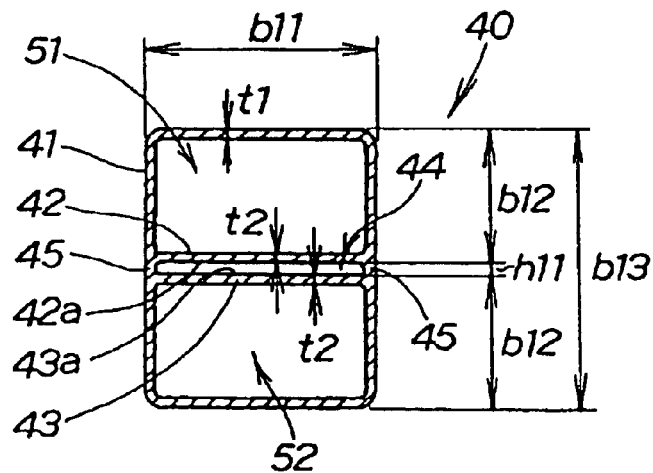

FIGS. 2A to 2C are diagrams illustrating the construction of a side frame (a hollow frame member) 40 according to the invention, in which FIG. 2A illustrates a construction in perspective, FIG. 2B illustrates a cross-sectional construction taken along the line b—b in FIG. 2A, and FIG. 2C illustrates a cross-sectional construction take along the line c—c in FIG. 2A.

The side frame 40 is a hollow frame member and is such as to be formed into a drawn product of a metal material such as iron, steel or aluminum alloy, an extruded product, a cast product or a product that is made by press folding sheet materials into shapes and jointing them together.

To be specific, the side frame 40 is an elongate hollow frame member having a square or rectangular cross section (hereinafter, both the cross sections being referred to as a "rectangular cross section" as a whole), that is, a structure having a closed cross section. The dimensions of the structure having a closed cross section is such that the length of a side is b11 and the length of the other side which is normal to the side having the length b11 is b13.

Hereinafter, the side frame 40 may be referred to, from time to time, as a "hollow frame member 40" depending on what is described.

The hollow frame member 40 is such that upper and lower two inner partition plates (first and second inner partition plates (42, 43) are formed integrally in the interior of the hollow frame member 40 in such a manner that they extend in a longitudinal direction of the frame member 40 and are close to each other along plate surfaces 42a, 43 thereof, so that a central space portion 44 defined by the two inner partition plates 42, 43 therebetween is formed in the interior of the hollow frame member 40.

The thickness of the first and second inner partition plates 42, 43 is t2, which is the same or substantially the same as the thickness of side plates 41, which is t1. A distance between the plate surfaces 42a, 43a is h11.

The invention is characterized in that the hollow frame member 40 can be dissociated by virtue of a buckling load at portions 45, 45 of the side plates 41 constituting the hollow frame member 40 which face the central space portion 44. Consequently, the hollow frame member 40 is dissociated at the portions 45, 45 which face the central space portion 44 so as to be divided into two upper and lower frame divisions, that is, a first frame division 51 and a second frame division 52.

The first frame division 51 is an elongate hollow frame member or a structure having a closed cross section which is formed so as to have a rectangular cross section by the side plates 41 and the upper first partition plate 42. The dimensions of the first frame division 51 is such that the length of a side is b11 and the length of the other side which is normal to the side having the length b11 is b12.

On the other hand, the second frame division 52 is an elongate hollow frame member or a structure having a closed cross section that is formed so as to have a rectangular cross section by the side plates 41 and the lower second inner partition plate 42. The dimensions of the second frame division 52 is such that the length of a side is b11 and the length of the other side which is normal to the side having the length b11 is b12.

The length b13 of the other side of the hollow frame member 40 is equalized with a sum of the length b12 of the other side of the first frame division 51, the length b12 of the other side of the second frame division 52 and the distance h11 between the plate surfaces 42a, 43a (b13=b12+b12+b11).

Next, the reasons for dividing the hollow frame member 40 into the fist frame division 51 and the second frame division 52 and the size of the distance h11 between the plate surfaces 42a, 43a will be described.

The following reports Nos. 1 and 2 are known as studies on crash energy absorbing characteristics in which crash energy generated when the vehicle is subjected to a front-end or rear-end collision is absorbed through the plastic deformation of the left and right side frames which extend longitudinally, that is, the front-end side frames or the rear-end side frames.

Report No. 1 . . . by Masatoshi Yamaya et al., entitled "Energy Absorption through Plastic Deformation of Thin Sheet Material Boxed Member" on pages 124 to 130 in the first issue of the eighth volume of Mitsubishi Heavy Industries Technical Report, Mitsubishi Heavy Industries Inc., issued in January, 1971

Report No. 2 . . . by Noriyuki Aya et al., entitled "Energy Absorbing Characteristics of Vehicle Bodies (First Issue)" on pages 60 to 66 in a collection of reports prepared and issued as the seventh issue of 1974 by Automobile Technology Association.

Figure 3A:
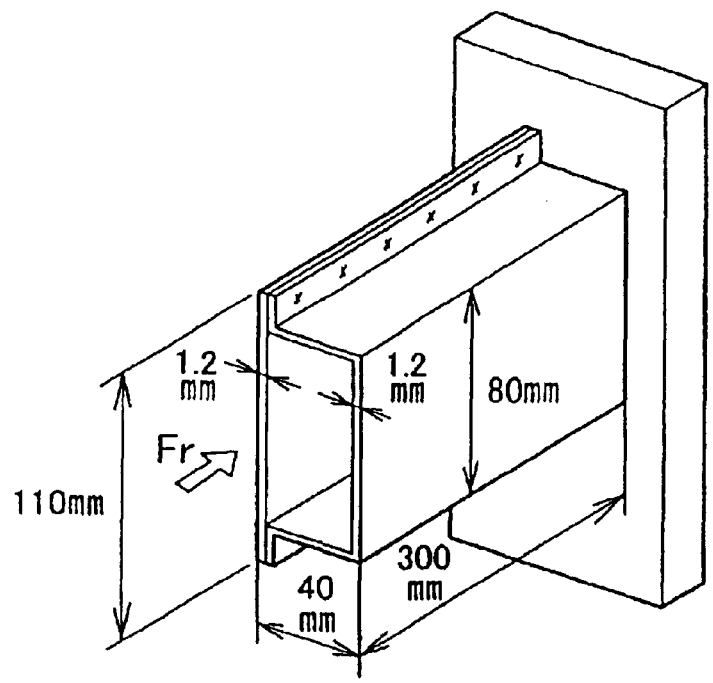
FIGS. 3A and 3B are explanatory diagrams explaining an energy absorption through the plastic deformation of a thin sheet material boxed member.
Figure 3B:
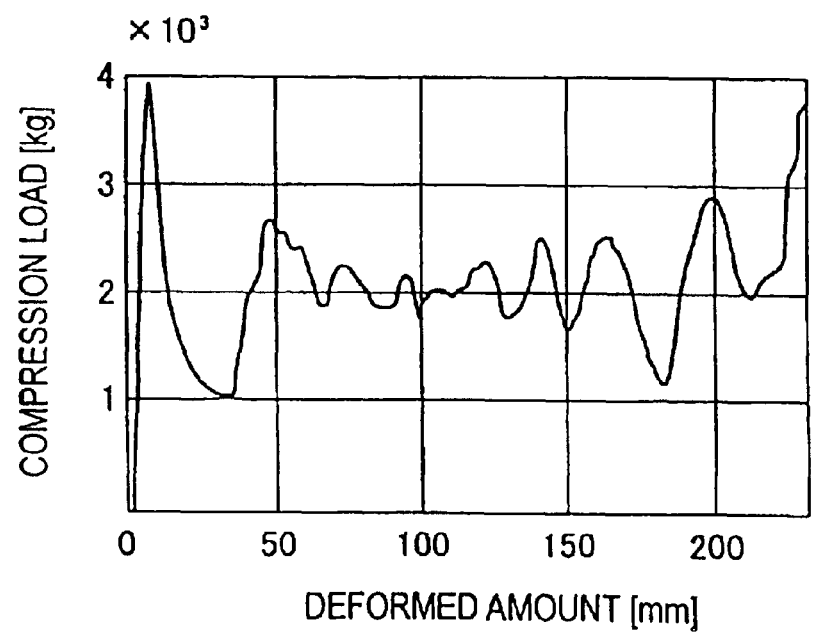

FIGS. 3A, 3B are explanatory diagrams which describe energy absorption through the plastic deformation of a thin sheet material boxed member, and are shown herein to illustrate in a combined fashion what are shown in FIGS. 1 to 3 and FIG. 5 in the aforesaid report No. 1.

FIG. 3A shows a test sample used for a static load compression test. The test sample is a steel product formed into a structure having a rectangular closed cross section by closing an opening in a top-hat member with a flat plate, the structure being 300 mm long and the closed cross section thereof extending uniformly along the full length thereof. The respective dimensions of the test sample are such that the width is 40 mm, the height 80 mm, the overall height of the top-had member 110 mm, and the thickness of the top-hat member and the flat plate 1.2 mm. Namely, the test sample is a structure having a rectangular closed cross section which is 40 mm wide and 80 mm high.

The results of a static load compression test in which a compression load Fr is longitudinally applied to the test sample are illustrated in FIG. 3B.

FIG. 3B is a graph illustrating the results of a static load compression test on the test sample described in FIG. 3A, in which graph the compression load applied the test sample is represented by the axis of ordinate while the deformed amount of the test sample is represented by the axis of abscissa.

According to FIG. 3B, it is recognized that when compressing the test sample which is 300 mm long, the compression load is generally stable until the deformed amount became around 150 mm, when the deformed amount exceeded around 150 mm, the compression load became unstable, and when the deformed amount exceeded around 200 mm, the compression load increased drastically.

Thus, when the test sample buckled and deformed until the length of the test sample became a half of the overall length thereof, since the compression load to effect the deformation rose drastically, and the continuation of deformation became difficult. This is true when considering partial buckling and deformation of the test sample in the longitudinal direction. In general, in the event that the test sample buckles and deforms in the longitudinal direction, it is known that the test sample buckles and deforms in such a manner as to form waveforms (bellows) substantially every certain pitch in the longitudinal direction. Let's assume that this certain pitch is referred to as a "buckling mode pitch p". It can be conceived that there is a note for deformation every buckling mode pitch p.

According to the results of the test, when also considering the buckling and deformation of the test sample occurring every buckling mode pitch p, when the test sample deforms to in the order of a half the buckling mode pitch p, the continuation of deformation will be difficult.

Incidentally, the buckling mode pitch p is known to vary in accordance with the size of the cross section of a test sample. This will be described based on FIGS. 4 and 5.

Figure 4A:
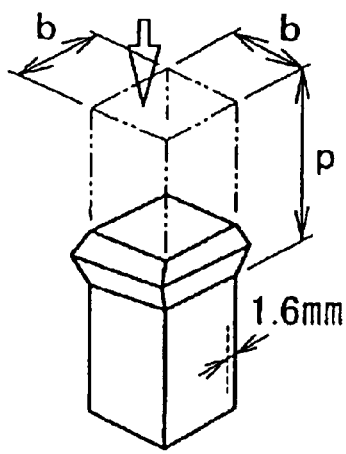
FIGS. 4A and 4B are explanatory diagrams (Part 1) explaining the energy absorbing characteristics of a vehicle body.
Figure 4B:
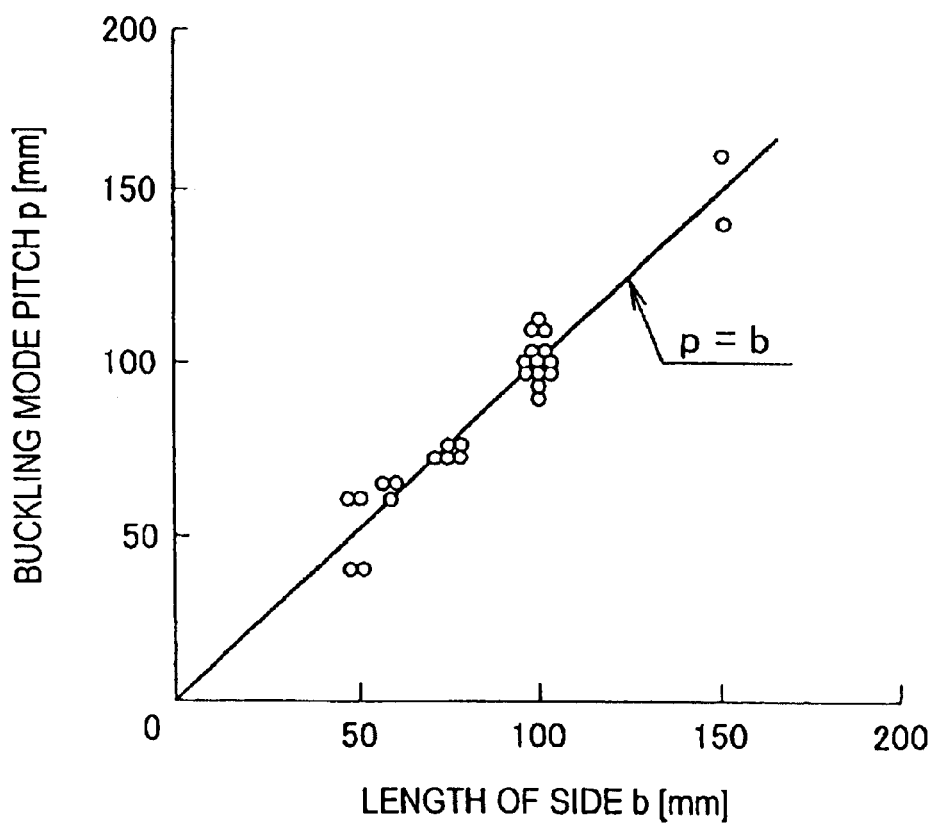

FIGS. 4A, 4B are explanatory diagrams (Part 1) which describe the energy absorption characteristics of a vehicle body, and are shown herein to illustrate what is shown in FIG. 11 in the aforesaid report No. 2.

FIG. 4A illustrates a test sample used a static load compression test. The test sample is a structure having a uniform square cross section in which the length of a side is set to b and the thickness thereof is 1.6 mm. Variation in buckling mode pitch p is illustrated in FIG. 4B which resulted when a longitudinal compression is applied to the test sample with the length of the side thereof being changed.

FIG. 4B is a graph illustrating the results of a static load compression test performed on the test sample illustrated in FIG. 4A, with the length b of the side of the test sample being represented by the axis of abscissa and variation in buckling mode pitch p being represented by the axis of ordinate.

According to FIG. 4B, it is recognized that the variation in buckling mode pitch p is in proportion to the variation in the length b of the side to thereby establish p=b.

Figure 5A:
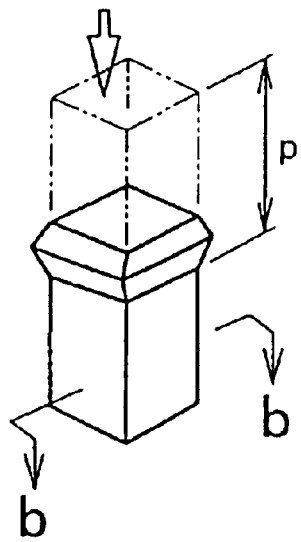
FIGS. 5A to 5C are explanatory diagrams (Part 2) explaining the energy absorbing characteristics of the vehicle body.
Figure 5B:
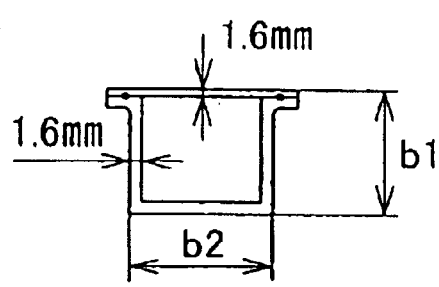
Figure 5C:
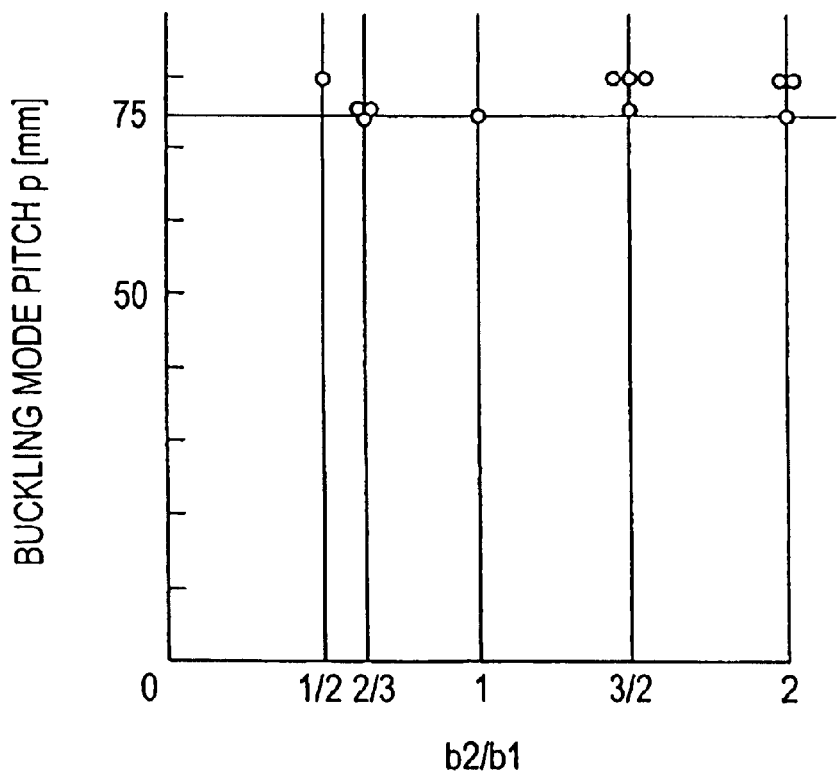

FIGS. 5A to 5C are explanatory diagrams (Part 2) which explain the energy absorbing characteristics of a vehicle body, and are shown herein to illustrate what is shown in FIG. 13 in the aforesaid report No. 2.

FIG. 5A shows a test sample used for a static load compression test, and FIG. 5B shows a cross-sectional construction taken along the line b—b in FIG. 5A. The test sample is a structure having a uniform rectangular cross section in which the length of a side is set to b1, the length of a side which is normal to the side having the length b1 is set to b2, and the thickness thereof is 1.6 mm. FIG. 5C illustrates the variation in the buckling mode pitch p resulting when a static load compression test is carried out on the test sample by applying a longitudinal compression load to the test sample with a sum of the length b1 of the one side and the length b2 of the other side thereof being set so as to become 150 mm (constant), and a ratio of the length b1 of the one side to the length b2 of the other side being caused to vary.

FIG. 5C is a graph illustrating the results of the static load compression test carried out on the test sample shown in FIG. 5A, with the ratio of the length b2 of the other side relative to the length b1 of the one side of the test sample being represented by the axis of abscissa and the variation in buckling mode pitch p being represented by the axis of ordinate.

According to FIG. 5C, it is recognized that with the sum (b1+b2) of b1 and b2 being constant, even if the ratio of b2 relative to b1 changes, the buckling mode pitch p remains constant. Namely, in case the circumferential length of the rectangular cross section and the circumferential length of the square cross section are equal, it can be said that loads generated become equal.

Thus, in the structure having the rectangular cross section, the buckling mode pitch p is determined by an average value of the length of the shorter side and the length of the longer side. Consequently, the structure having the rectangular cross section may be considered as a structure having a square cross section which has a circumferential length equal to that of the structure having the rectangular cross section.

Figure 6A:
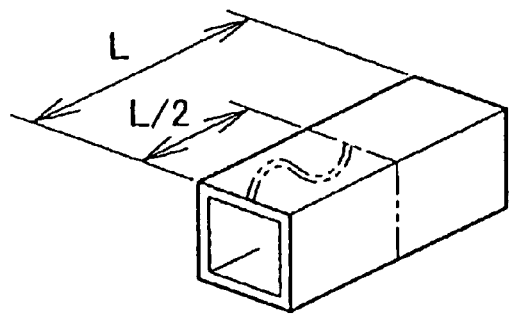
FIGS. 6A and 6B are explanatory diagrams (Part 3) explaining the energy absorbing characteristics of the vehicle body.
Figure 6B:
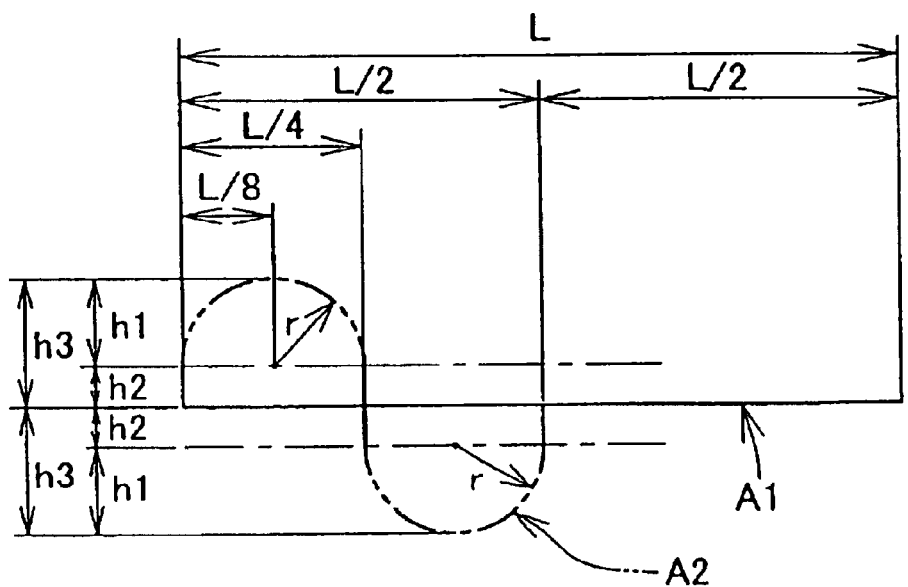

FIGS. 6A, 6B are explanatory diagrams (Part 3) which describe the energy absorbing characteristics of the vehicle body. FIG. 6A illustrates that a structure having a rectangular cross section which is shown in solid lines as having a length L buckled and deformed in a waveform-like (a bellows-like) fashion shown in imaginary lines as a result of a longitudinal buckling and deformation of the structure to such an extent that the length thereof is decreased to a half thereof.

FIG. 6B is a diagram illustrating diagrammatically the structure having a rectangular cross section shown in FIG. 6A.

A horizontal linear line A1 shown in a solid line illustrates diagrammatically one of the side plates of the structure having a rectangular cross section shown in FIG. 6A. The length of the linear line A1 is L1, which is the same as that of the structure having a rectangular cross section.

On the other hand, a waveform-like curve A2 shown in an imaginary line illustrates diagrammatically a theoretical model in which the linear line A1 having the length L deformed when the structure having a rectangular cross section shown in FIG. 6A is caused to buckle and deform until the length thereof is decreased to a half the original length thereof. The length of the curve A2 is the same as the length L of the linear line A1.

When the linear line A1 buckles and deforms, as shown by the curve A2, the linear line A1 first deviates to protrude outwardly of the structure having a rectangular cross section and then deviates to protrude inwardly thereof. These continuous outward and inward protrusions can form substantially an arc at a top of each curve. As this occurs, the height of each protrusion is h3. The radius r of the arc of each protrusion is one eighth the length L of the linear line A1 (r=0.125×L). In addition, the height of a semi-circle having a radius r is equal to r (h1=r=0.125×L).

Since the length of the curve A2 is equal to the length L of the linear line A1, the height h2 from the linear line A1 to the arc of the curve A2 is expressed by the following equation (1).

$$H2=(L-2\times\pi\times r)/4=0.054\times L) \ldots \quad (1)$$

Consequently, the height from the linear line A1 to the top of the arc of the curve A2 or the height of each protrusion is expressed by the following equation (2).

$$H3=h1+h2=(0.125+0.054)\times L\approx 0.18\times L \ldots \quad (2)$$

As is clear from what is described heretofore, the respective side plates of the structure having a rectangular cross section plastically deform in the waveform-like fashion when the structure is caused to buckle and deform in the longitudinal direction until the length thereof is decreased to a half the original length thereof. The protrusion height of the waveform is equal to the height h3 of the protrusion. The invention is such as to employ this fact that the protrusion height of the waveform becomes h3. Note that the height h3 of the protrusion is substantially a minimum height.

Figure 7:
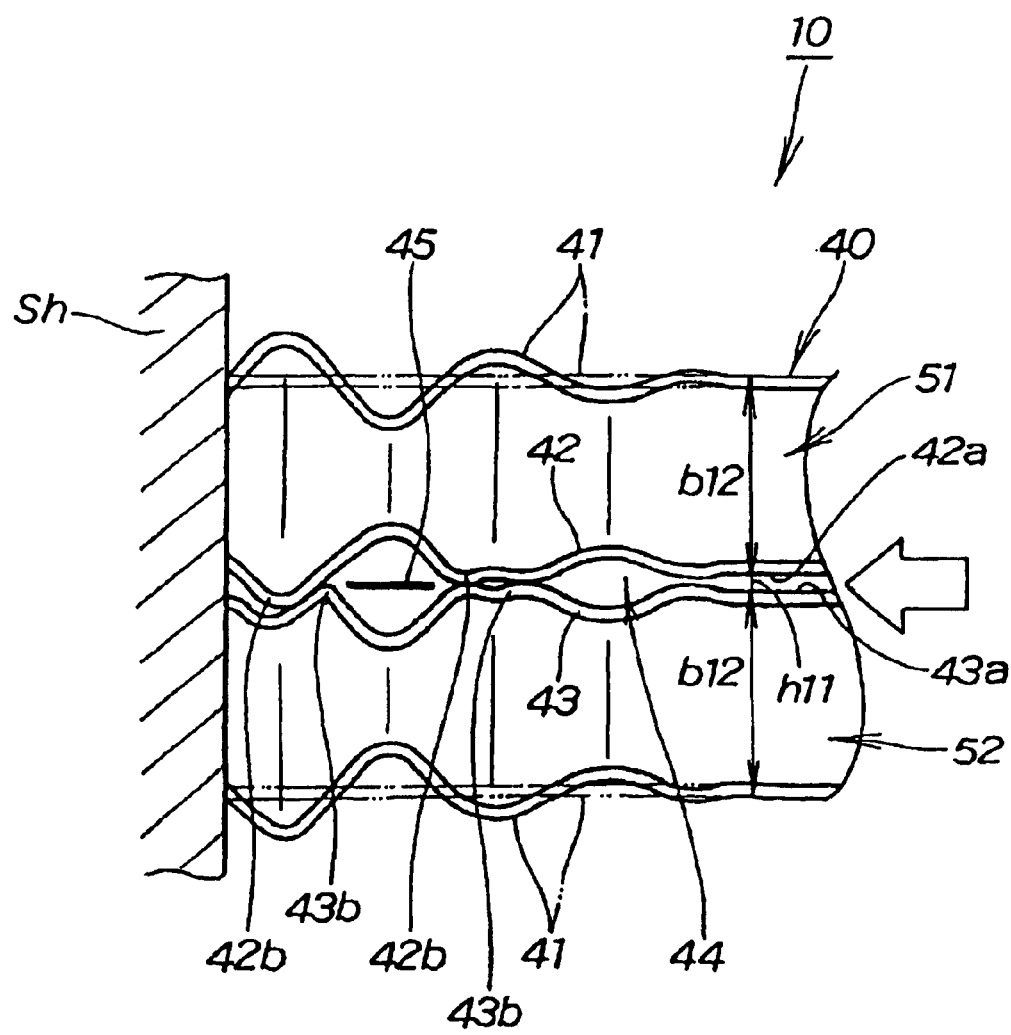
FIG. 7 is a principle diagram illustrating the absorption of crash energy by the hollow frame member according to the invention.

FIG. 7 is a principle diagram illustrating the absorption of crash energy by the hollow frame member according to the invention and illustrates a principle of absorption of crash energy through a plastic deformation of the hollow frame member 40 extending longitudinally along the vehicle body which occurs when the vehicle 10 is subjected to a front-end or rear-end collision against an obstacle Sh, corresponding to FIG. 2B.

Note that the "buckling strength" means a compressive strength (a crushing strength) against a compression load applied longitudinally to the hollow frame member 40 and the first and second frame divisions 51, 52 when crash energy is applied to the distal end of the hollow frame member 40.

The words "buckles and deforms" mean the collapse (pressurized failure) of the hollow frame member 40 and the first and second frame divisions 51, 52 after the hollow frame member 40 and the first and second frame divisions 51 52 are caused to deform plastically by virtue of the aforesaid compression load.

When crash energy is applied to the distal end (a left-hand side of the drawing) of the hollow frame member 40 shown in imaginary lines as a result of the collision of the vehicle 10 against the obstacle Sh, the hollow frame member 40 buckles and deforms from the distal end thereof in the waveform-like (bellows-like) fashion, that is, deforms plastically. To be specific, the side plates 41 and the first and second inner partition plates 42, 43 plastically deform as indicated by solid lines by virtue of the crash energy so applied.

Here, let's assume that the distance h11 between the plate surfaces 42a, 43a is sufficiently small. Of the waveform-like deformed portions, waveform-like protruding portions 42b . . . which protrude from the first inner partition plate 42 toward the second inner partition plate 43 and waveform-like protruding portions 43b . . . which protrude from the second inner partition plate 43 toward the first inner partition plate 42 are brought into collision against and interference with each other.

A force with which these protruding portions 42b . . . , 43b . . . are caused to interfere with each other (an interference load) is applied in a direction in which the first and second frame divisions 51, 52 are caused to dissociate from each other. As a result, the portion 45 of the side plate 41 constituting the side frame 40 which face the central space portion 44, that is, the breakable portion 45 fails to be dissociated by virtue of an interference load when it exceeds a certain value.

After the breakable portion 45 is dissociated, the first and second frame divisions 51, 52 become independent members from each other. The cross-sectional areas of the first and second frame divisions 51, 52 which have become so independent from each other are extremely smaller than the pre-dissociation overall cross-sectional area of the hollow frame member 40. Due to this, the buckling strength of the first and second frame divisions 51, 52 is extremely smaller than the pre-dissociation overall buckling strength of the hollow frame member 40. Consequently, the buckling and deformation of the first and second frame divisions 51, 52 is facilitated further.

This is the reason whey the hollow frame member 40 (the side frame 40) is constructed so as to be divided into the first frame division 51 and the second frame division 52.

Incidentally, it is a precondition for the interference of the protruding portions 42b . . . , 43b . . . that the distance h11 between the plate surfaces 42a, 43a are sufficiently small.

As is clear from what is described in FIG. 6, the height of the protrusion when the first and second frame divisions 51, 52 deform in the waveform-like (bellows-like) fashion is h3. By setting the distance h11 smaller than a half the height h3 of the protrusion, the protruding portions 42b . . . , 43b . . . can be brought into interference with each other.

Next, referring to FIG. 8, the function of the hollow frame member 40 constructed as is described heretofore will be described.

FIGS. 8A to 8E are diagrams illustrating the function of the hollow frame member, the illustration being implemented by taking for example a case where the vehicle collides against the obstacle Sh.

Figure 8A:
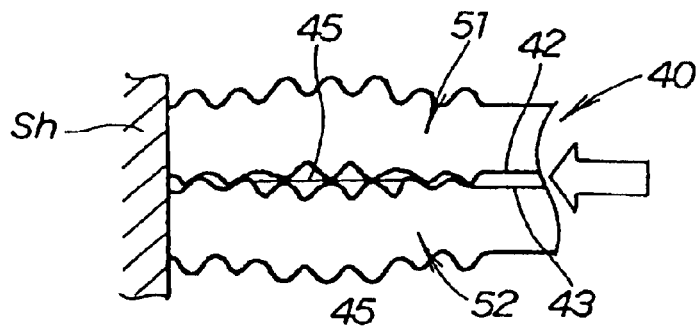
FIGS. 8A to 8E are diagrams illustrating the function of the hollow frame member.

FIG. 8A illustrates that the hollow frame member is buckled and deformed in the bellows-like fashion from the distal end (a left-hand side of the drawing) thereof when crash energy is applied to the distal end as a result of the collision of the vehicle against the obstacle Sh. As a result, the first and second inner partition plates 42, 43 plastically deform in the waveform-like fashion to thereby be brought into interference with each other. Due to this, the first and second frame divisions 51, 52 are pushed to be bent in opposite directions to each other.

Figure 8B:
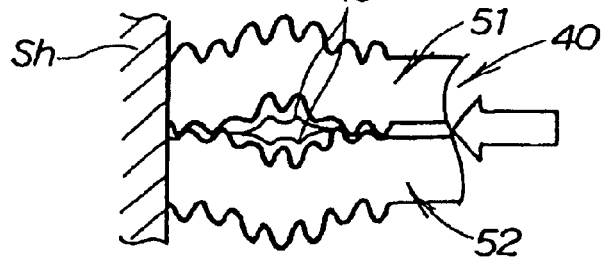

FIG. 8B illustrates that as a result of the first and second frame divisions 51, 52 being pushed to be bent further in the opposite directions to each other by the crash energy, the breakable portion 45 starts to fail to be dissociated.

Figure 8C:
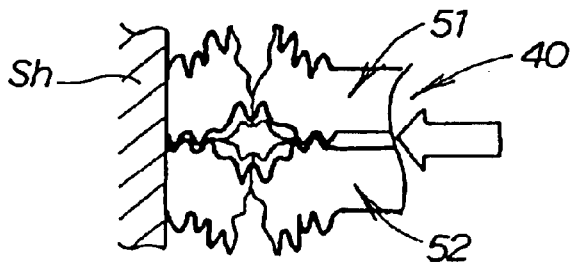

FIG. 8C illustrates that the first and second frame divisions 51, 52 which are now partially independent from each other are folded in the opposite direction to each other by the crash energy, whereby the first and second frame divisions 51, 52 are dissociated widely.

Figure 8D:
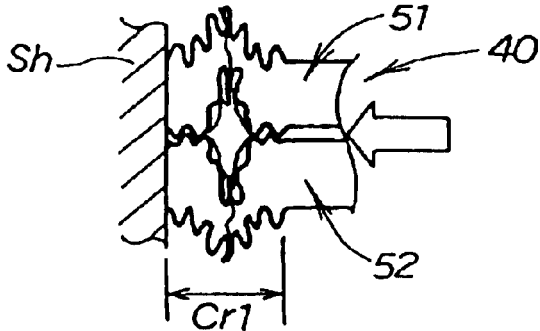

FIG. 8D illustrates that the first and second frame divisions 51, 52 which are now folded in the opposite direction to each other are dissociated more widely by the crash energy while being collapsed in the longitudinal direction. Since the deformation of the hollow frame member 40 As this is occurring is extremely large, as a result, the amount Cr1 of a portion of the hollow frame member 40 that remains not deformed is extremely small. Consequently, the absorption of crash energy by the hollow frame member 40 is large.

Figure 8E:
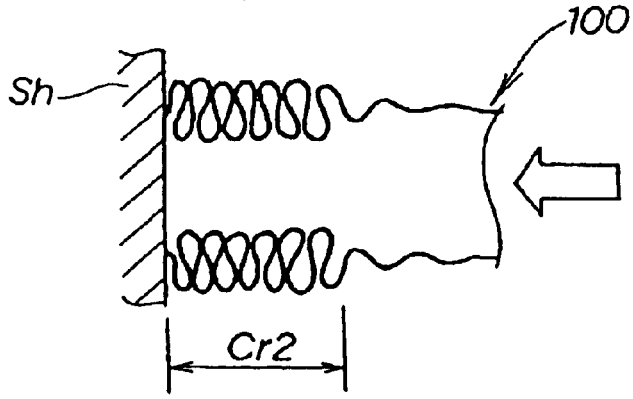

On the other hand, FIG. 8E illustrates that a hollow frame member 100 according to a comparison example is buckled and deformed from a distal end thereof in the bellows-like fashion by virtue of crash energy.

The hollow frame member 100 of the comparison example is a general structure having a rectangular cross section and is constructed to be provided with no such first and second inner partition plates 42, 43 as those provided on the hollow frame member 40 according to the invention. With the hollow frame member 100 like this, since the cross-sectional area remains as it is, the buckling strength remains as being large. Due to this, since the hollow frame member 100 deforms relatively small, as a result, the amount Cr2 of a portion that remains not deformed is larger than the amount Cr1 of the portion of the hollow frame member 40 that remains not deformed (Cr1<Cr2).

As is clear from what is described above, the vehicle body frame 20 (refer to FIG. 1) is such that the hollow frame members 40 such as the side frames which extend longitudinally along the vehicle body are provided thereon. As shown in FIG. 2, the invention is characterized in that the two inner partition plates 42, 43 are formed integrally in the interior of each of the hollow frame members 40 in such a manner that the two inner partition plates 42, 43 extend in the longitudinal direction of the frame member 40 and are close to each other along the plate surfaces 42a, 43a thereof, so that the central space portion 44 defined by the two inner partition plates 42, 43 therebetween is formed in the interior of the hollow frame member 40.

According to the construction, the side plates 41 constituting the hollow frame member 40 can be dissociated at the portions 45, 45 of the side plates 41 which face the central space portion 44 by virtue of the crash energy, that is, the buckling load.

Consequently, when the hollow frame member 40 plastically deforms in the bellows-like fashion by virtue of the crash energy applied to the longitudinal distal end of the hollow frame member 40, the inner partition plates 42, 43 are caused to strike each other so as to break the breakable portions 45. Due to this, the hollow frame member 40 can be dissociated into two from the failed breakable portions 45 acting as a boundary. The buckling strength at the dissociated portions is extremely smaller than the pre-dissociation buckling strength of the hollow frame member 40. The amount of the portion of the hollow frame member 40 which remains not deformed can be made smaller, and as a result, the absorption of crash energy by the hollow frame member 40 can be increased further.

Next, modified examples to the hollow frame member 40 will be described based on FIGS. 9 to 12. Note that like reference numerals are imparted to like constituent components to those described by reference to FIGS. 1 to 8, the description thereof being omitted.

Figure 9A:
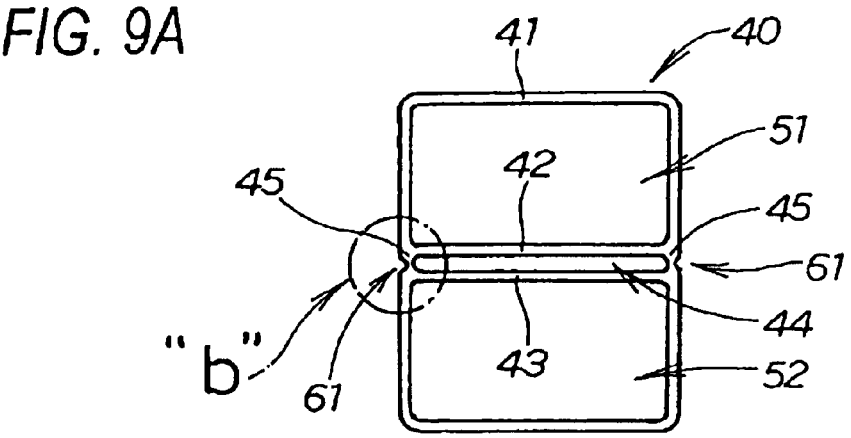
FIGS. 9A to 9C are diagrams illustrating the construction of a hollow frame member (a first modified example) according to the invention.
Figure 9B:
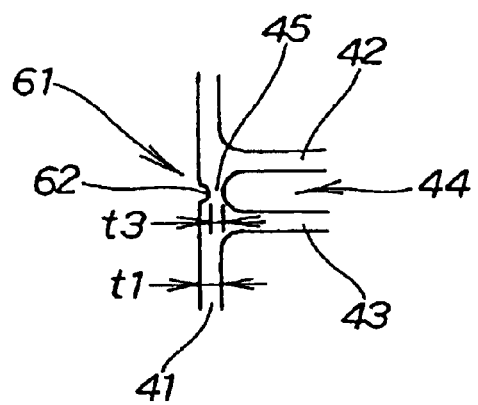
Figure 9C:
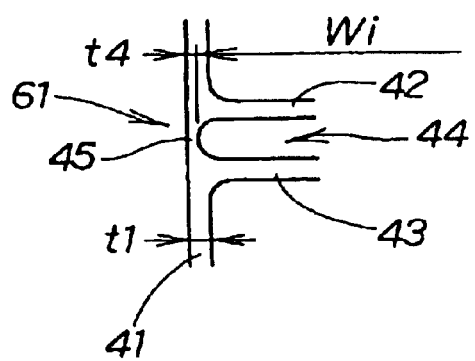

FIGS. 9A to 9C are diagrams illustrating the construction of a hollow frame member (a first modified example) according to the invention.

FIG. 9A is a diagram illustrating a hollow frame member 40 in a corresponding manner to FIG. 2C, and FIG. 9B is an enlarged view of a portion indicated by a reference character b in FIG. 9A. The hollow frame member 40 according to the first modified example is characterized in that frail portions 61, 61 are formed at portions 45, 45 of side plates 41 which face a central space portion 44, that is, breakable portions 45, 45. To be specific, grooves 62, 62 are formed at the breakable portions 45, 45 on the side plates 41 in external surfaces which are opposite to the central space portion 44 along the longitudinal direction of the hollow frame member 40, so that the thickness t3 of the breakable portions 45, 45 is decreased. The thickness t3 is smaller than the thickness t1 of the side plate 41.

FIG. 9C illustrates a modified example to the first modified example shown in FIG. 9B in a corresponding manner to FIG. 9B. With frail portions 61, 61 of the further modified example, in the rectangular cross section shown in FIG. 9A, the thickness t4 of the breakable portions 45, 45 is decreased by extending the width Wi of the central space portion 44 as close to as the external surface of the side plate 41. The thickness t4 is the same as the thickness t3 shown in FIG. 9B.

According to the first modified example, the failure can be facilitated further at the breakable portions 45, 45.

Figure 10A:
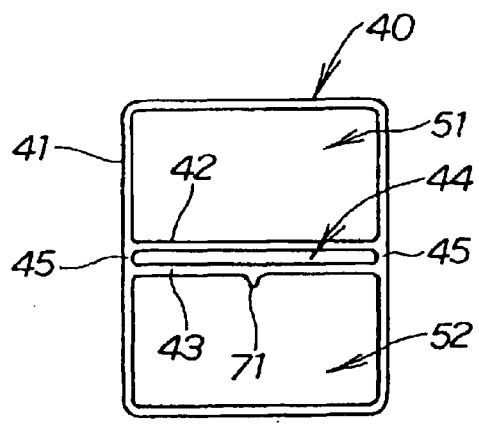
FIGS. 10A and 10B are diagrams illustrating the construction of a hollow frame member (a second modified example) according to the invention.
Figure 10B:
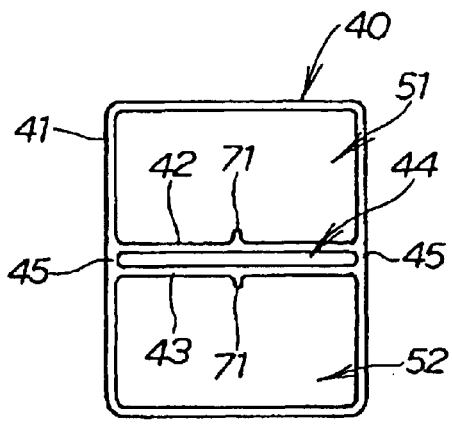

FIGS. 10A, 10B are diagrams illustrating the construction of a hollow frame member (a second modified example) according to the invention in which the hollow frame member 40 is illustrated in a corresponding manner to FIG. 2C.

FIG. 10A illustrates that a rib 71 is formed on a plate surface of an inner partition plate 43, which is one of first and second inner partition plates 42, 43 formed in the hollow frame member 40 of the second modified example. The rigidity (surface rigidity) of the inner partition plate 43 can be enhanced by the rib 71.

FIG. 10B illustrates that ribs 71, 71 are formed on plate surfaces of the first and second inner partition plates 42, 43 of the hollow frame member 40 of the second modified example. The rigidity (surface rigidity) of the first and second partition plates 42, 43 can be enhanced by the ribs 71, 71.

The ribs 71, 71 are formed on the plate surfaces of the first and second inner partition plates 42, 43 which are located on opposite sides to a central space portion 44. These ribs 71, 71 are longitudinal plate-like reinforcement members which extend in a longitudinal direction of the hollow frame member 40 at widthwise central positions of the first and second inner partition plates 42, 43, respectively. Note that the height and thickness of the rib 71 may be substantially the same or smaller than the thickness t2 (refer to FIG. 2) of the first and second inner partition plates 42, 43. This is because excessive height and thickness will result in an excessive rigidity of the first and second inner partition plates 42, 43, which will result, in turn, in the requirement of an excessive force to deform the first and second inner partition plates 42, 43.

According to the second modified example, since the rigidity of the inner partition plates 42, 43 is increased, the inner partition plates 42, 43 can be caused to plastically deform in a more regulated waveform-like fashion when the hollow frame member 40 is caused to deform plastically in the bellows-like fashion by crash energy.

Figure 11A:
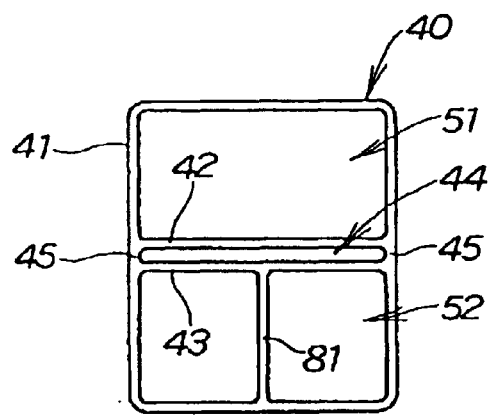
FIGS. 11A and 11B are diagrams illustrating the construction of a hollow frame member (a third modified example) according to the invention.
Figure 11B:
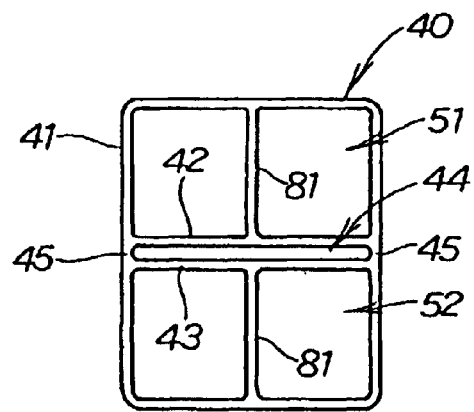

FIGS. 11A, 11B are diagrams illustrating the construction of a hollow frame member (a third modified example) according to the invention in which the hollow frame member 40 is illustrated in a corresponding manner to FIG. 2C.

In the hollow frame member 40 according to the third modified example, as is shown in FIG. 11A, the cross section of at least one of first and second frame divisions 51, 52 is partitioned by a partition plate 81, and in addition, as is shown in FIG. 11B, both the cross sections of the first and second frame divisions 51, 52 are partitioned by partition plates 81, 81, respectively.

According to the third modified example, by dividing the cross sections of the first frame division 51 and the second frame division 52 by the partition plates 81 so as to decrease the average length of a side of the quadrangular cross section, a buckling mode pitch (bellows-like folding pitch) can be decreased further when the hollow frame member 40 is caused to plastically deform in the bellows-like fashion by virtue of crash energy, and as a result, the frequency at which first and second inner partition plates 42, 43 are brought into interference with each other can be increased.

Figure 12:
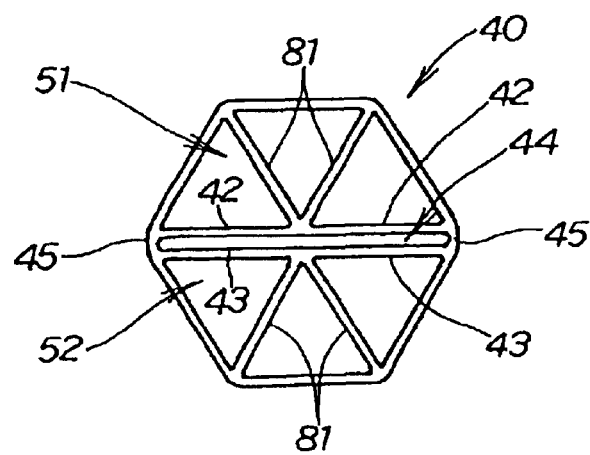
FIG. 12 is a diagram illustrating the construction of a hollow frame member (a fourth modified example) according to the invention.

FIGS. 12 is a diagram illustrating the construction of a hollow frame member (a fourth modified example) according to the invention in which the hollow frame member 40 is illustrated in a corresponding manner to FIG. 11C.

The hollow frame member 40 according to the fourth modified example has a construction resulting when a further modification is made to the third modified example shown in FIG. 11B, in which modification the hollow frame member 40 is applied to a structure having a heteromorphic cross section such as a hexagonal cross section instead of the structure having the rectangular cross section.

Thus, the constructions of the hollow frame member 40 which are illustrated in the embodiment shown in FIGS. 1 to 8 and the modified examples shown in FIG. 9 to 11 can be applied to the structure having a heteromorphic cross section.

In the embodiment of the invention, note that the distance h11 between the plate surfaces 42a, 43a may be set to a size which can allow the inner partition plates 42, 43 to strike each other when the hollow frame member 40 is caused to plastically deform by crash energy which is applied to the hollow frame member 40.

In addition, more desirable functions and advantages can be exhibited by combining appropriately the construction of the embodiment illustrated in FIGS. 1 to 8 and the constructions of the respective modified examples illustrated in FIGS. 9 to 11. For example, the construction of the first modified example shown in FIG. 9 and the construction of the second modified example shown in FIG. 10 can be combined together.

According to the constructions of the invention that are described heretofore, the following advantages can be exhibited.

According to the first aspect of the invention, since the hollow frame members such as the side frames which extend longitudinally along the vehicle body are provided on the vehicle body frame and the two inner partition plates are formed integrally in the interior of each of the hollow frame members in such a manner that the two inner partition plates extend in the longitudinal direction of the frame member and are close to each other along the plate surfaces thereof, so that the central space portion defined by the two inner partition plates therebetween is formed in the interior of the hollow frame member, the side plates constituting the hollow frame member can be dissociated at the portions of the side plates which face the central space portion by virtue of a buckling load.

Consequently, when the hollow frame member plastically deforms in the bellows-like fashion by virtue of crash energy applied to the longitudinally distal end of the hollow frame member, the two inner partition plates are caused to strike each other so that the side plates can be broken at the breakable portions, whereby the hollow frame member can be dissociated into two parts from the breakable portions so broken which act as a boundary. The buckling strength at the dissociated portion is extremely smaller than the buckling strength of the hollow frame member before it is dissociated. The size of the hollow frame member that remains after it deformes can be decreased further. As a result, the absorption of crash energy by the hollow frame member can be increased further.

According to the second aspect of the invention, by forming the frail portions at the portions of the side plates constituting the hollow frame member which face the central space portion, the breakage of the side plates at the breakable portions can be facilitated.

According to the third aspect of the invention, since the rib is formed on the plate surface of at least either of the two inner partition plates, the rigidity of the inner partition plate can be enhanced. When the hollow frame member plastically deforms in the bellows-like fashion by virtue of crash energy, the inner partition plate can be caused to plastically deform in the more regulated waveform-like fashion.

What is claimed is:

1. A vehicle body frame comprising:

hollow frame members which extend longitudinally along a vehicle body provided thereon, and two inner partition plates formed integrally in the interior of each of the hollow frame members in such a manner that the two inner partition plates extend in a longitudinal direction of the frame member and are close to each other along plate surfaces thereof; wherein a central space portion defined by the two inner partition plates therebetween is formed in the interior of the hollow frame member, and side plates constituting the hollow frame member can be dissociated at portions of the side plates which face the central space portion by virtue of a buckling load.

2. The vehicle body frame as set forth in claim 1, wherein the side plates constituting the hollow frame member each have a frail portion formed at the portion which faces the central space portion.

3. The vehicle body frame as set forth in claim 1, further comprising:

a rib formed on the plate surface of at least either of the two inner partition plates.

* * * * *